United States Patent [19]

Durston et al.

[11] Patent Number: 4,707,848
[45] Date of Patent: Nov. 17, 1987

[54] TEST SET COMMUNICATION/INTERFACE SYSTEM

[75] Inventors: Thomas W. Durston; George D. Fleitz; Steven R. Coffelt, all of Camarillo; James D. Eckman, Port Hueneme; Wayne K. Wong, Camarillo; Theodore E. Chavannes, Thousand Oaks, all of Calif.

[73] Assignee: Harris Corporation, Melbourne, Fla.

[21] Appl. No.: 889,276

[22] Filed: Jul. 25, 1986

[51] Int. Cl.⁴ .................. H04M 1/00; H04M 3/22
[52] U.S. Cl. ................................ 379/1; 379/93; 379/96; 379/109
[58] Field of Search .............. 379/29, 93, 45, 48, 379/96, 97, 100, 108, 109, 38, 67, 37, 1

[56] References Cited

U.S. PATENT DOCUMENTS 3,673,329 6/1972 Weld et al. ................... 379/108
4,656,651 4/1987 Evans et al. ................... 379/1

Primary Examiner—Stafford D. Schreyer
Attorney, Agent, or Firm—Antonelli, Terry & Wands

[57] ABSTRACT

The telephone line test capability of a craftsperson's test set is supplemented by communication/interface circuitry which carries out data communications with a host central office control processor, and contains memory for storing (task assignment) information downloaded from the central office control processor. This task assignment information stored in the test set-communications unit may be coupled from the unit to an associated printer for providing a hard copy of service assignment information to the field technician. In addition to printing out the downloaded task assignment information, the printer unit contains a charging circuit which charges a rechargeable battery in the handset for powering its internal circuitry. During off-duty hours, the test set may be connected to a home dispatch unit installed in the craftsperson's home and through which the handset is coupled to a telephone link for providing off-duty communications with the central office processor without technician intervention. The home dispatch unit also contains a battery charging circuit through which the test set's internal battery is charged when the test set is coupled to the dispatch unit and communications between the central office and the test set-communication unit are not taking place.

70 Claims, 7 Drawing Figures

TEST SET COMMUNICATION/INTERFACE SYSTEM

FIELD OF THE INVENTION

The present invention relates, in general, to telephone test equipment and is particularly directed to a system for effecting communications between a telephone network control facility (e.g. central office) and a telephone craftsperson's service equipment (test set).

BACKGROUND OF THE INVENTION

Service personnel employed by the telephone companies for handling the installation, testing, maintenance and repair of telephone equipment include supervisory/task assignment personnel at a control facility (e.g. central office), and mobile field service technicians (craftspersons) who carry out their assigned task assignments under the direction of a dispatcher at the central office. Over the years a typical work day of a field craftsperson begins with the technician driving to the central office to pick up the day's assignments and then travelling to various job sites identified on a work schedule. At the job sites the service technician employs equipment that interfaces with the telephone line for testing the operation and capability of communications circuits and for calling the central office for task assignment information from the dispatcher.

With the decentralization of the telephone industry into a plurality of local operating companies, there has been a reduction in service personnel, particularly at central office facilities, as the local companies have continued to incorporate automated equipment for monitoring and controlling network operations. As a consequence of this reduction in personnel, when a service technician at a remote job site needs to communicate with control personnel at the central office, the service technician must often wait for service (typically for a period of time on the order of fifteen minutes or more), thereby delaying the completion of that task and subsequent assignments for the day. Moreover, because the exchange of information between the service technician at the job site and the dispatcher at the central office is essentially a voice communication, the craftsperson must write job information by hand, in the course of the conversation with the central office dispatcher, thereby making the communication both labor intensive and time (and therefore revenue) consuming.

SUMMARY OF THE INVENTION

In accordance with the present invention, the labor and time intensive limitations of conventional communications between a task assignment center (e.g. central office) and a field technician are effectively obviated by a communication scheme that may be incorporated in the craftsperson's hand test set and which serves to accommodate a number of functions automatically without the need for the continuous participation or intervention of service personnel in the communication process Pursuant to the present invention the test functions provided within the service technician's handset are augmented by communication/interface circuitry which carries out data communications with a host task assignment center (e.g. central office) control processor, and contains memory for storing (task assignment) information downloaded from the control processor. This task assignment information stored in the test set-communications unit may be coupled from the unit to an associated printer for providing a hard copy of service assignment information to the field technician. In addition to printing out the downloaded task assignment information, the printer unit contains a charging circuit which charges a rechargeable battery in the handset for powering its internal circuitry. The communication/interface circuitry of the test set also includes a speaker amplifier that permits the service technician to audibly monitor synthesized voice instructions from the control processor and data communication signalling between the control processor and the test set-communications unit or any audio information on the subscriber loop.

As a further feature for expediting the communication of task assignment information to a field service technician, the present invention includes a home dispatch unit that is typically installed in the craftsperson's home and through which the handset is coupled to a telephone link for providing data communications with the task assignment center processor without technician intervention. Like the printer unit, the home dispatch unit contains a battery charging circuit through which the test set's internal battery is charged when the test set is coupled to the dispatch unit and communications between the task assignment center and the test set-communication unit are not taking place. When the service technician is off duty (e.g. at night), the home dispatch unit charges the test set's battery and enables the test set-communication unit to automatically receive incoming calls from the central processor, so that next day task assignments may be downloaded from the central office to the unit's internal memory. When going back on duty, the service technician interfaces the test set-communication unit with the printer and thereby obtains a hard copy of a current work schedule that was prepared by the host central office processor during off duty hours.

The present invention provides the local telephone company with a communication apparatus that facilitates communications between field service personnel and automated control equipment at the task assignment center. Not only are the delays commonly encountered by service technicians, even during routine servicing of job site telephone equipment, circumvented, but also there is afforded a substantial increase in productivity, as task assignment pick-up travel time is avoided. Moreover, because the test set-communication unit is readily interfaced, as is, with each of the printer unit and home dispatch unit, it is unnecessary to remove the battery for charging by a separate device. This enables the test set-communication unit circuitry to be effectively ruggedized to withstand severe environmental abuse.

DETAILED DESCRIPTION

Figure 1:
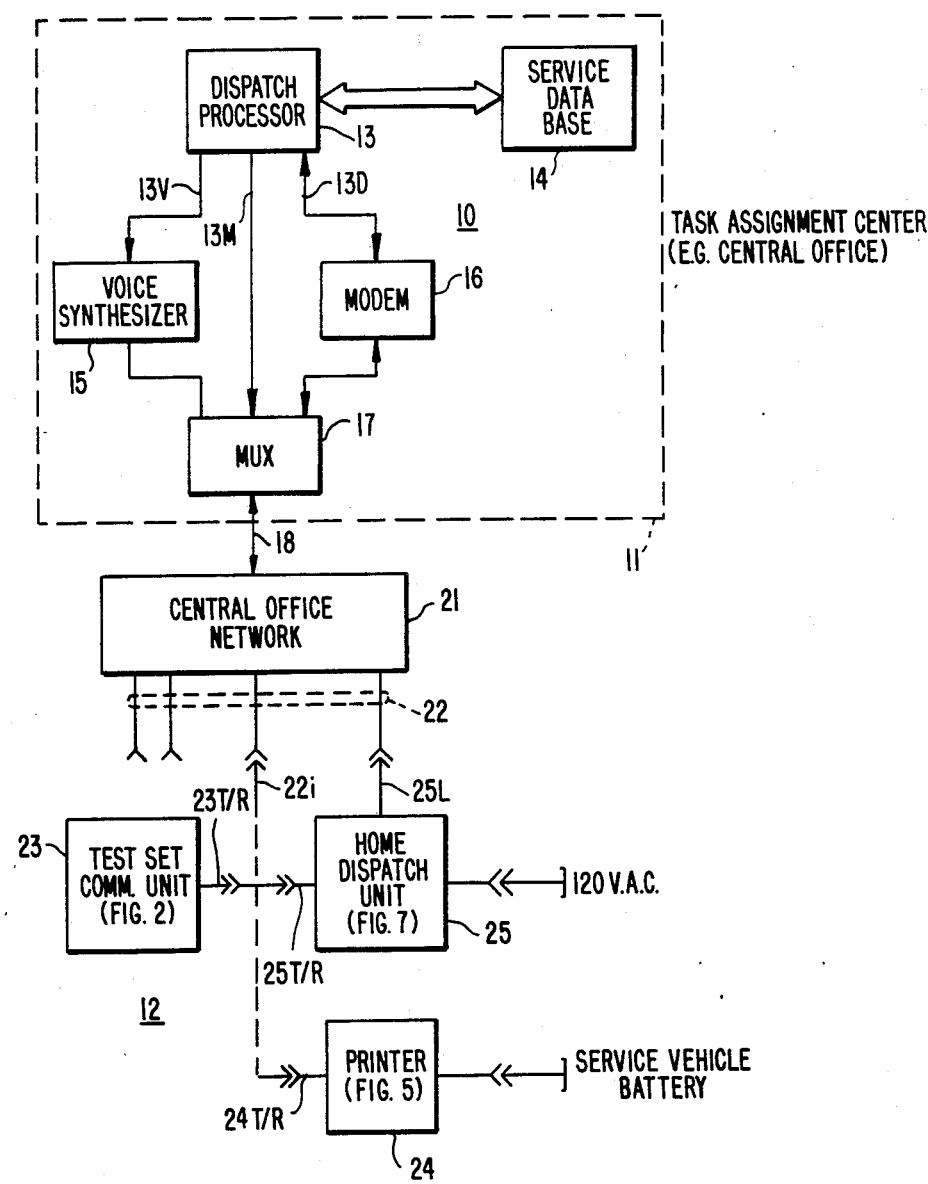
FIG. 1 is a block diagram illustration of a test set communications/interface system in accordance with the present invention.

Before describing, in detail, the particular improved test set communications/interface system in accordance with the present invention, it should be observed that the invention resides primarily in a novel structural combination of conventional telephone and signal processing circuits, and not in the particular detailed configurations thereof. Accordingly, the structure, control and arrangement of such conventional circuits has been illustrated in the drawings by readily understandable block representations and schematic diagrams, which show only those specific details that are pertinent to the present invention, so as not to obscure the disclosure with structural details which will be readily apparent to those skilled in the art having the benefit of the description herein. In addition, the illustration of data processing system and telephone network components have been simplified in order to emphasize those portions that are most pertinent to the present invention. Thus, the block diagram/schematic diagram illustrations of the Figures do not necessarily represent the mechanical structural arrangement of the exemplarily system, but are primarily intended to illustrate the major structural components of the system in a convenient functional grouping, whereby the present invention may be readily understood.

Referring now to FIG. 1 of the Drawings, the test set communications/interface system of the present invention is diagrammatically illustrated as including a job assignment information source 10, located at a task assignment center, such as a central office 11, which stores job assignment information (e.g. relating to the installation, testing, maintenance and repair of telephone equipment) that is to be controllably supplied to a field craftsperson's service equipment 12, either at the request of the craftsperson or under internal control, via a communication link (central office telephone network) 21. Information source 10 preferably comprises a host dispatch processor 13 (such as an IBM System I processing system) and an associated telephone equipment maintenance/status data base 14 (accessed via a port such as an IBM 3270 terminal interface). As described briefly above, host dispatch processor 13 effectively replaces a human dispatcher who normally sits at a terminal console, which interfaces with a data base 14, and verbally conveys to a service technician information which the dispatcher has accessed from the service data base 14.

Host dispatch processor 13 has a pair of communication ports 13V and 13D through which respective synthesized voice and data communication signals are coupled to the central office network 21. Port 13V is coupled to a voice synthesizer 15 (such as a DECTALK voice synthesizer manufactured by Digital Equipment Corporation) the output of which is coupled to a first port of a multiplexer 17. Processor 13 employs voice synthesizer 15 to supply instructions to or request information from a craftsperson via a speaker contained in the craftsperson's field equipment which is coupled to one of the telephone lines 22 of network 21. Port 13D of host dispatch processor 13 is coupled to a data communications modem (such as a Bell 212A modem) which is connected to a second port of multiplexer 17. Modem 16 performs data communication signalling between processor 13 and a companion modem contained within the craftsperson's service equipment 12. The selective connection of voice synthesizer 15 or modem 16 via multiplexer 17 to link 18 and central office telephone network 21 is controlled by a signal on link 13M from host dispatch processor 13.

As mentioned above, pursuant to the present invention, for obtaining task assignment information from the central office, the craftsperson's field equipment 12 may include a test set-communication unit 23 (to be described in detail below in conjunction with the description of FIGS. 2-4, a printer 24 (to be described in detail below in conjunction with the description of FIGS. 5 and 6), and a home dispatch unit 25 (to be described in detail below in conjunction with the description of FIG. 7). Test set-communications unit 23 contains telephone apparatus-line test circuitry with which the craftsperson is able to perform prescribed test functions via a (tip/ring) interface port 23T/R. For this purpose, the test set portion of unit 23 is preferably of the type described in copending patent application Ser. No. 813,156, filed Dec. 24, 1985, entitled "Telephone Test Set", by R. W. Faith and T. W. Durston and assigned to the Assignee of the present application. As described in that application, the test set is a hand held unit containing line equipment terminal connection ports, LED test indicators and an I/O keypad through which the craftsperson selectively engages prescribed test and monitor functions of the internal test circuitry. As an understanding of the test features, per se, is unnecessary for an appreciation of the present invention, an explanation of the test functions within unit 23 and a description of the circuitry for accomplishing those functions will not be detailed here. Instead, attention may be directed to the above-identified application for a specific description of the test set portion of unit 23.

As will be detailed below in conjunction with description of FIGS. 2-4, the communications/interface circuitry within test set-communications unit 23 provides the craftsperson with the ability to communicate, via interface port 23T/R and a telephone line 22-i, with the host dispatch processor 13, and obtain job assignment information in the form of data communication signals that are transmitted via modem 16 within the task assignment center 11 and a companion modem within test set-communications unit 23 for storage in memory within unit 23. Unit 23 also contains a speaker through which synthesized voice signals transmitted from the processor 13 at the task assignment center 11 may be audibly presented to the craftsperson in handsfree mode of operation of unit 23.

Also included as part of the craftsperson's service equipment 12 is a printer 24 which, via a port 24T/R, is adapted to be interfaced with port 23T/R of the test set-communications unit 23 for providing a hard copy of job assignment information that has been downloaded from the central office dispatch processor 13, either directly to the test set-communications unit 23 or indirectly through the home dispatch unit 25. Printer 24 may be housed in the craftsperson's service vehicle and is normally coupled to the vehicle's 12 volt battery. When the test set-communications unit 23 is connected, via ports 23T/R-24T/R, to the printer 24, the printer may operate in either a charging mode or a print mode. In the charging mode, power supply interface circuitry within the printer 24 charges a rechargeable 9 volt battery contained within the test set-communications unit 23. In the print mode, printer 24 transfers the data which has been downloaded into buffer memory within the unit 23 from the dispatch processor 13 into its own internal buffer and prints the data upon command for use by the service technician.

Further included as part of the field equipment 12 is a home dispatch unit 25, which, via port 25T/R, is adapted to be interfaced with the port 23T/R of test set-communications unit 23 during the off duty hours of the craftsperson, so as to permit data communications to be conducted between the central office dispatch processor 13 and the test set-communications unit 23, either under the control of the dispatch processor 13 at the task assignment center 11 or through an internal program through which the home dispatch unit 25 dials the processor 13, so that job assignment information may be downloaded from the processor 13 into the internal memory of the test set-communications unit 23, without participation or intervention by the craftsperson.

In other words, home dispatch unit 25 is essentially an off-duty (e.g. night time) operational unit through which job information may be automatically downloaded from the task assignment center when the craftsperson is off-duty. In addition, like printer 24, home dispatch unit 25 performs the function of charging the rechargeable battery within the test set-communications unit 23, when the test set is connected to it and communications between the task assignment center 11 and the interconnected test set-communication unit 23 and home dispatch unit 25 are not taking place. For this purpose, home dispatch unit 25 employs a power supply interface unit which is coupled to a standard 120 volt AC wall outlet in the service technician's residence and supplies a charging output voltage for recharging the 9 volt battery contained within the test set-communications unit 23.

Figure 2:
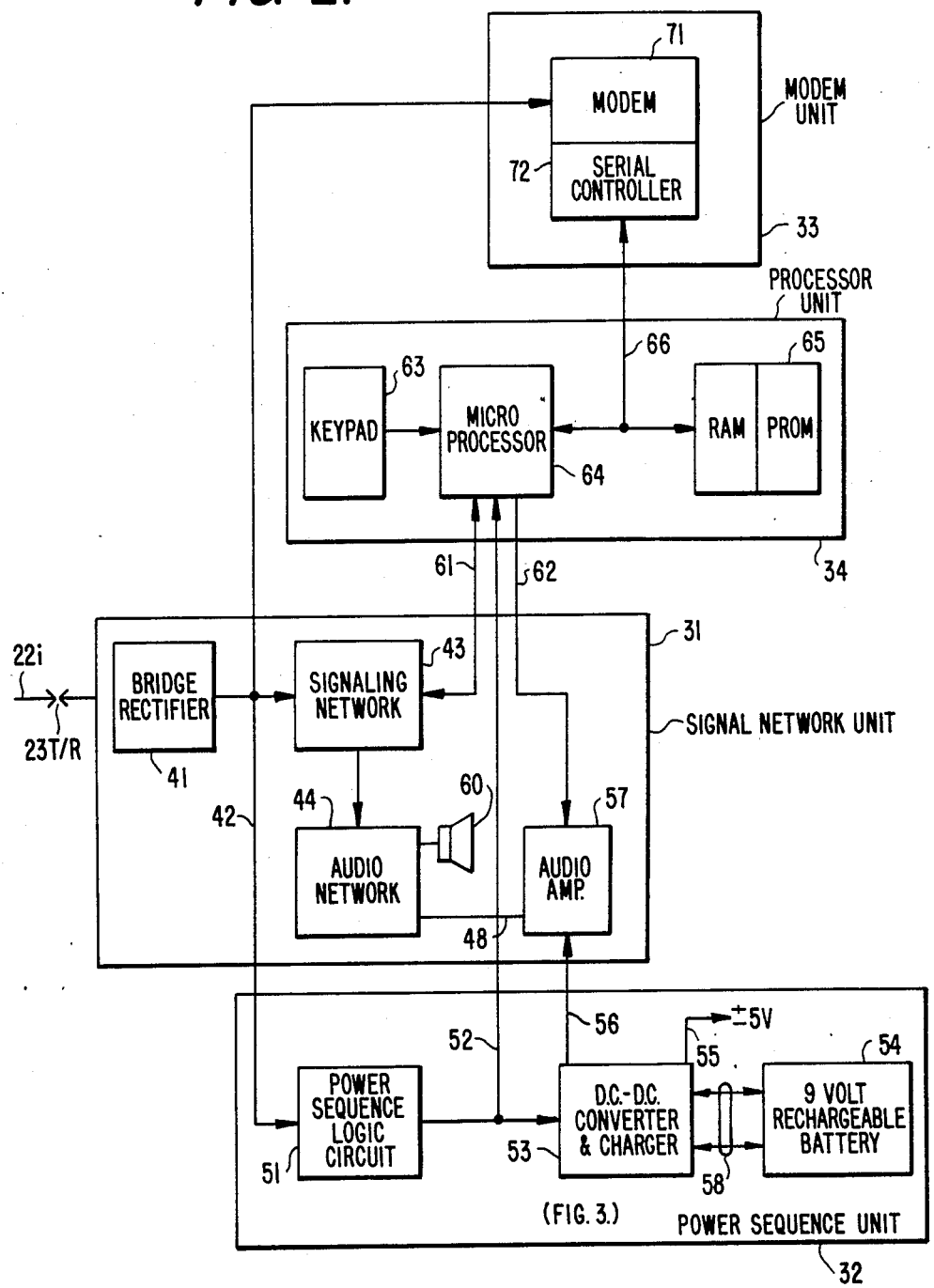
FIG. 2 is a diagrammatic illustration of the circuit configuration of a test set-communications unit in accordance with the present invention.

Referring now to FIG. 2, there is shown a schematic block diagram of the test set-communications unit 23 shown in FIG. 1, through which the telephone service craftsperson gains access to and receives job assignment information from dispatch processor 13 within the task assignment center 11. For this purpose, unit 23 includes a signal network unit 31 which through interface port 23T/R is adapted to be interfaced to the tip/ring leads of a telephone line 22-$i$ and conduct signalling between the unit and the telephone line, a power sequence unit 32 for controlling the supply of power to the internal circuitry of unit 23 and for controlling the charging of an internal rechargeable 9 volt battery, a modem unit 34 through which digital data communications between the test set-communications unit 23 and the telephone line 22-$i$ are controlled, and a processor unit 34 for controlling the overall operations of the test set-communications unit 23.

Signal network unit 31 includes a (talk/monitor) switch (not shown) coupled with interface port 23T/R, for selectively coupling a high impedance circuit across phone line 22-$i$, depending upon whether the craftsperson wishes to use the unit 23 in its normal talk mode or for unobtrusive monitoring of activity on the phone line 22-$i$. In the description of the operations of the respective components of the system to follow, it will be assumed that the (talk/monitor) switch has been placed in the talk mode.

Signal network unit 31 further includes a bridge rectifier 41 which is adapted to be coupled through the tip and ring leads of the interface port 23T/R to phone line 22-$i$ for insuring proper polarity of the signals on the phone line with respect to internal circuitry of unit 23. The output of bridge rectifier 41 is coupled over line 42 to a signalling network 43 within the signal network unit 31, to power sequence unit 32 and to modem unit 33. Signalling network 43 contains conventional DTMF or rotary (interrupted current) dialling circuitry.

Signal network unit 31 also contains a audio network 44 (including a receiver and internal microphone (not shown)) and a speaker 60 for interfacing audio signals between the telephone line 22-$i$ and the service technician. The audio speaker 60 of the audio network unit 44 is coupled over a link 48 to an audio amplifier 57. Amplifier 57 controllably amplifies audio signals to be coupled to speaker 60 under the control of a audio level control signal supplied over link 62 from an internal control microprocessor 64 within processor unit 34. Microprocessor 64 is also coupled over link 61 to the signalling network 43 within signal network unit 31 for controlling the tone signals to be transmitted over the telephone line 22-$i$ to the dispatch processor 13.

In addition to microprocessor 64, processor unit 34 includes attendant memory unit 65 containing read only memory in which the control program for the operation of the test-set communications unit 23 resides and random access memory for data storage as required by microprocessor 64. Input/output ports of the microprocessor 64 are accessible by a keypad 63 (preferably corresponding to the keypad in the test set described in the above-identified copending application) through which the craftsperson controls the test set-communications unit to carry out test and communication functions. In order to facilitate the present description, rather then provide a detailed explanation of the firmware through which microprocessor 64 controls the operation of the test-set communications unit 23, the description infra will present a discussion of the operational sequence that is carried out in response to the interfacing of the test set-communications unit with a respective signal coupling port of the system (e.g. telephone line 22-$i$, printer 24, home dispatch unit 25).

The processor unit 34 is coupled by way of its communications bus 66 to modem unit 33. Modem unit 33 contains a conventional data communications modem 71 (such as a Bell 212A modem) and attendant serial controller 72 to which the communications bus link 66 from the processor unit 34 is coupled. Modem 71 is coupled to line 42 for conducting digital data communications signalling through port 23T/R to telephone line 22-$i$.

As mentioned briefly above, powering (including controlled charging of the 9 volt battery) for the internal circuitry of the test set-communications unit 23 is controlled by a power sequence unit 32, which includes a power sequence logic circuit 51 (the details of which will be described below in conjunction with the description of FIGS. 3 and 4), a DC-DC converter and charger circuit 53 and battery 54. Power sequence logic circuit 51 is coupled to link 42 and detects whether the test set-communications unit 23 is coupled to a telephone line or a charging source (e.g. printer 24 or home dispatch unit 25). It also interfaces a charging voltage supplied over link 42 from the tip/ring terminals of interface port 23T/R to charger 53. In addition, power sequence logic circuit 51 supplies control signals over output link 52 to microprocessor 64 within the processor unit 34. Converter 53 is coupled to an internal rechargeable (9 volt) battery 54 and serves to charge battery 54 when the test set is connected to the printer or home dispatch unit and those respective units are placed in their charge modes. Converter 53 also serves to supply regulated voltages for processor unit 34 and modem unit 33.

OPERATION

Operation of the test set-communications unit will depend upon whether the unit is connected directly to a phone line or whether it is connected to the home dispatch unit or the printer, each of the home dispatch unit and printer constituting a charging source (for charging the internal 9 volt battery 54 contained within power sequence unit 32), and in what mode the test set-communications unit is operating when so connected. For purposes of the present description, it will be assumed that the mode of operation involves a craftsperson accessing the dispatch processor 13 in the task assignment center 11 by placing a call to that processor and initiating a data communication sequence to download job assignment information from the host processor to test set communications unit 23. (A description of the operation of the test set-communications unit when connected with the home dispatch unit and with the printer, respectively, will be discussed below in connection with the description of those specific units.)

To use the test-set communications unit for accessing job assignment information from the dispatch processor 13 within the task assignment center 11, the service technician connects the coupling port terminals of interface port 23T/R to respective tip and ring portions of a telephone line 22-*i*. In response to detecting the connection of port 23T/R to telephone line, power sequence logic circuit 51 supplies an output signal over output link 52 to converter and charger unit 53, causing the converter to supply a regulated +5 volts (derived from 9 volt battery 54) to the processor unit 34, thereby powering up the processor unit 34. At this time, the modem unit 33 and the audio amplifier 57 are not powered up.

Next, using the keypad 63, the service technician calls the dispatch processor 13 within the task assignment center 11 by entering a dialing code corresponding to the phone number of the remote dispatch processor 13 and a craftsperson code identifying the service technician calling party. Microprocessor 64 reads the information keyed in by the service technician and supplies control signals over link 61 to the signalling network 43 within the signal network unit 31, whereby dialing signals (e.g. DTMF) signals are transmitted out over the telephone link 22-*i* to the task assignment center 11 and decoded by the remote dispatch processor 13. The service technician also employs the keypad 63 to turn on the audio amplifier 57 and adjust the volume level of the audio amplifier 57 (via link 62 from microprocessor 64), and thereby set the audio amplitude level of the output speaker 60 to which the service technician will listen when receiving digitized voice signals from the dispatch processor 13.

Dispatch processor 13, upon decoding the (DTMF) signals from the test set-communications unit 23, accesses a service communication program through which a processor-based dialog with the service technician may take place. As noted above, part of the code information keyed in by the service technician is a craftsperson identification code, so that the processor effectively knows who is calling. Because job assignments are normally preassigned to service technicians based on specified control factors such as geography, mobile equipment capability, etc., reading the identity of the calling technician permits the dispatch processor 13 to efficiently tailor a set of voice communication instructions to the craftsperson. This set of voice signal communication instructions, or menu, is generated by dispatch processor 13 via voice synthesizer 15 and transmitted over the telephone network to the test set-communications unit 23. These voice signal instructions are received by audio network 44 and coupled to output speaker 60, whose amplification level has been set at the level prescribed by the technician via keypad 63, as described above.

The service technician listens to the synthesized voice menu generated by the dispatch processor, as the menu is presented to the technician by way of the test-set communications unit speaker 60. After listening to the menu, and assuming that the service technician wishes to download job assignment data from the dispatch processor 13 (i.e. initiate a data communications transmission between task assignment center 11 and unit 23), the technician next keys in request instructions via keypad 63, which key codes are converted into tone signals via microprocessor 64 and signalling network 43 and transmitted over the telephone line to the dispatch processor 13 within the task assignment center 11. At this time the service technician also keys-in the data rate to be employed during data communications between modem unit 33 and modem 16 at the central office 11 (e.g. 1,200 b.p.s. or 300 b.p.s.). Microprocessor 64 decodes the information keyed-in by the craftsperson and turns on the modem, initiating the operation of the modem unit 33. Modem 71 within test set-communications unit 23 and modem 16 the central office 10 carry out conventional full duplex digital data communications (including carrier lock, sync character generation, start of transmission, framing, error check code, end of sequence, etc.), so that successive frames of data are transmitted from the dispatch processor 13 and downloaded through modem unit 33 for storage into random access memory within the memory unit 65 of the processor unit 34. As data signals are being transmitted over the telephone link 22-*i* and received by audio network 44, they are coupled to the output speaker 60 to provide to the service technician with an audio indication of the downloading of job information.

At the end of the data transmission, microprocessor 64 sees an end of transmission character in the communication sequence and turns off the modem unit 33. At the central office 11, dispatch processor 13 transmits a new voice menu requesting further instructions from the service technician. Assuming that there is no further job information requested by the service technician, the service technician may then turn off the unit and remove the connection between port 23T/R and the tip and ring leads of telephone line 22-*i*. The power sequence logic circuit 51 detects the unit having gone back on-hook and transmits a signal over link 52 to converter 53 to power-down processor unit 34 and modem unit 33. Through the use of a separate memory retention battery (e.g. 3 volt Lithium battery) within the processor unit 34, the data which has been downloaded from the dispatch processor into memory unit 65 is retained for subsequent printout using the printer 24.

Figure 3:
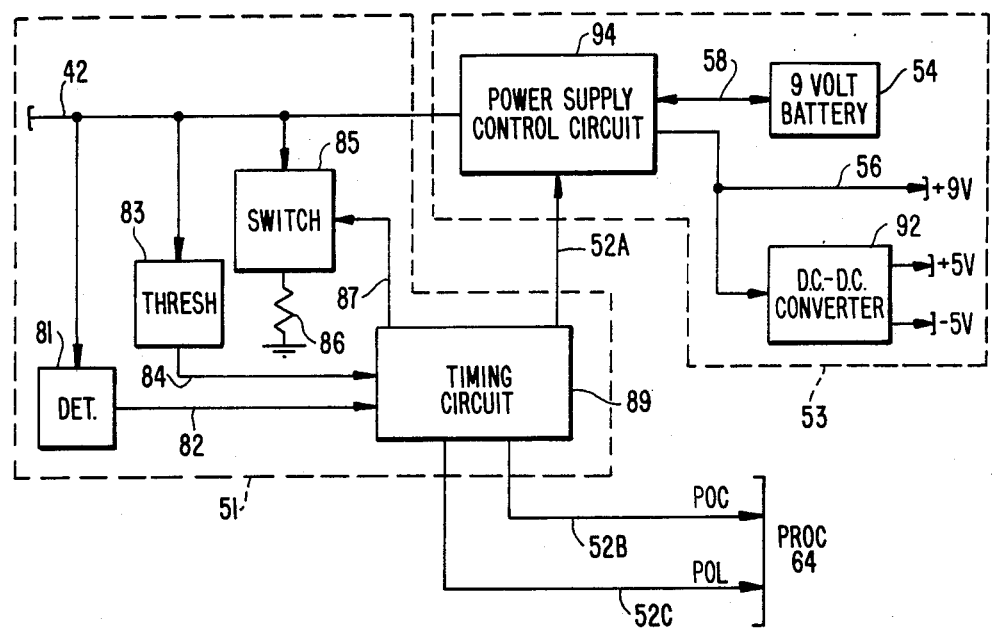
FIG. 3 is a diagrammatic illustration of the power sequence logic circuit and charging circuitry of the power sequence unit shown in FIG. 2.
Figure 4:
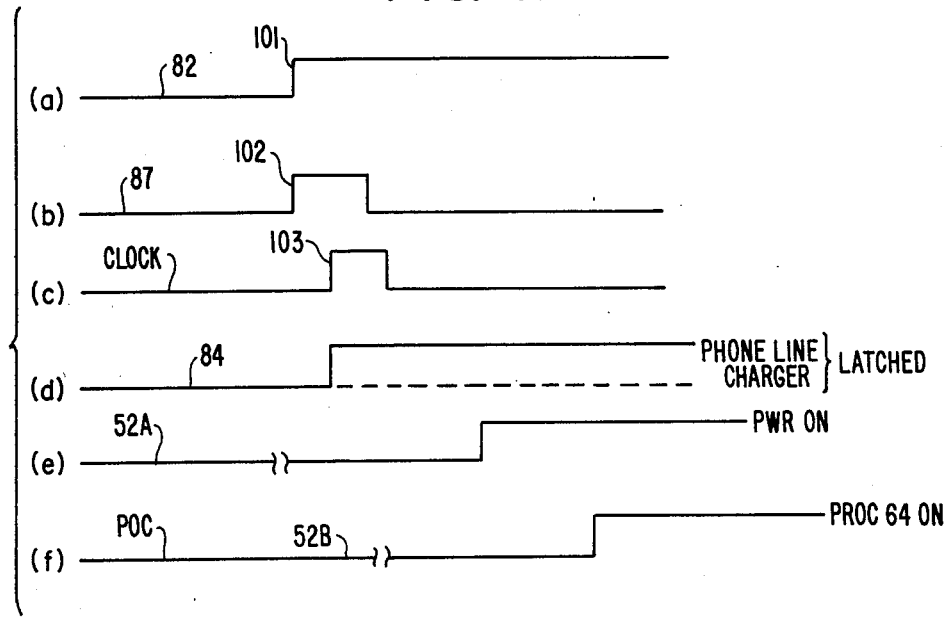
FIG. 4 is a set of timing diagrams for explaining the operation of the power sequence logic circuit of FIG. 3.

Referring now to FIG. 3, the circuit configuration of the power sequence unit 32 will be described in detail.

As pointed out above, power sequence logic circuit 51 performs the function of determining whether the test set-communication unit 23 is coupled to a phone line or to a battery charging source (e.g. printer unit 24). For this purpose, output link 42 of bridge rectifier 41 is coupled to a voltage detection circuit 81, the output of which is coupled over link 82 to a timing circuit 89. Timing circuit 89 comprises a set of flip-flops and combinational logic for producing timing signals to be described below in conjunction with the description of FIG. 4. Voltage detection circuit 81 preferably comprises a Schmitt trigger amplifier circuit which triggers in response to the test set-communications unit 23 being connected to a circuit which draws current, so that link 42 from bridge rectifier 41 will undergo a change in voltage level.

Link 42 is also coupled to a second voltage detection circuit, specifically a threshold circuit 83, which produces an output on link 84 depending upon the magnitude of the voltage on link 42. Threshold circuit 83 performs the function of monitoring the voltage level on link 42 when a low impedance shunt (e.g.$\simeq$50$\Omega$) resistor 86 is controllably coupled through a switch 85 between link 42 and ground. The closing of switch 85 is controlled by a signal on link 87 from timing circuit 89. Switch 85 is closed for a brief period of time (e.g. 1 millisecond) sufficient for threshold circuit 83 to obtain a reading of the voltage level on link 42 and thereby provide an indication of whether interface port 23T/R of test set-communications unit 23 is connected to a phone line or to a charging source. As will be explained below in conjunction with the description of the printer 24 (shown in FIG. 5) the input/output terminal leads 24T/R of the printer to which the interface port 23T/R test set-communications unit 23 is to be connected are bridged by a capacitor which in the talk mode, as mentioned supra, when initially connected to the terminals of interface port 23T/R of test set-communications unit 23, provides a precharged voltage of sufficient magnitude to be recognized by threshold circuit 83 as representative of a charger (e.g. printer) connection. Switch 85 serves to discharge that capacitor at a rate sufficient for threshold circuit 83 to make the measurement; once the capacitor in the printer unit is discharged, the printer signalling/charging port 24T/R provides a high impedance to permit digital data communication signalling between the modems of the respective printer unit and test set-communications unit 23, for downloading data from memory unit 65 to be printed out by the printer.

Link 42 is also coupled to a power supply control circuit 94 within DC-DC converter and charger unit 53. Switched power supply circuit 94 includes a regulated voltage power supply and gating circuitry controlled by link 52A from timing circuit 89 for controllably supplying an output charging voltage over link 58 to 9 volt rechargeable battery 54, when in the charging mode (namely when the test set-communications unit 23 is connected to printer 24), and to couple the output of 9 volt battery 54 to link 56 (input to DC-DC converter 92) when the test set-communications unit 23 is connected to a telephone line. The 9 volt output of power supply control circuit 94 is also coupled to link 56 during the charging mode to supply a regulated 9 volt output to the audio amplifier 57 within the signal network unit 31, and to a DC-DC converter 92 which provides ±5 volt regulated outputs for powering the microprocessor and modem circuit components of the test set-communications unit 23. Timing circuit 89 also includes a pair of additional outputs 52B and 52C for respectively supplying a power-on clear representative signal and a printer on-line representative signal, to be described below.

Referring now to the timing diagram of FIG. 4, the operation of the power sequence unit shown in FIG. 3 will be described in detail. As pointed out above, when the tip/ring terminals of interface port 23T/R are coupled to either a telephone line or to a charging source (e.g. printer unit), a voltage is placed on link 42 at the output of bridge rectifier 41. Voltage detector 81 detects the voltage and supplies an output on link 82, shown as an edge 101 in FIG. 4(a). Timing circuit 89 responds to this signal by closing switch 85 via link 87, to thereby place terminating resistor 86 between ground and line 42 for a prescribed period of time (e.g. 1 millisecond). The closing of switch 85 for this prescribed period of time is represented by the signal shown in FIG. 4(b). The leading edge 102 of the signal on link 87 (FIG. 4(b)) is coincident with edge 101 at the output of voltage detector 81 on link 82. During a measurement interval represented by the signal shown in FIG. 4(b) the output of voltage threshold circuit 83 will be one of two prescribed states. For purposes of the present description, a first state, corresponding to the connection to a battery charging source, will be represented by a binary one, while a second state, corresponding to the connection to a telephone line, will be represented by a binary zero. If the test set-communications unit 23 is connected to a charging source, the voltage on link 42 will remain above a prescribed threshold for a time sufficient to be detected by threshold circuit 83 during the measurement interval, corresponding to the closing of switch 85 shown in FIG. 4(b). With the threshold of voltage detection circuit 83 being exceeded, its output on link 84 will be a binary "1". Through an internal clock signal shown in FIG. 4(c), timing circuit 89 latches the output on link 84 into a flip-flop at time 103, shown in FIGS. 4(c) and FIG. 4(d). If the test set-communications unit is connected to a telephone line, rather than a charging source, the voltage on link 42 will not be sufficient to trigger threshold circuit 83 and a binary "0" will be latched at time 103 into the flip-flop of timing circuit 89. Thus, depending upon whether a "0" or a "1" has been latched in the internal flip-flop of timing circuit 89 as a result of the operation of threshold circuit 83, timing circuit 89 supplies a control signal on link 52A to power supply control circuit 94, so as to control the charging operation of the unit. If the test set-communications unit 23 is connected to a charging source (e.g. printer), a battery charging voltage will be coupled over link 42 from the charging source for charging the 9 volt battery 54 and for supplying a power supply voltage through which power supply control circuit 94 supplies power for operating the internal circuitry of the test set-communications unit 23. This signal on link 52A causes power control supply 94 to connect the power supply to charge battery 54 and to supply a 9 volt output on link 56 at some prescribed time subsequent to initial clock edge 103 (e.g. 100 milliseconds following clock edge 103) as shown in FIG. 4(e).

After the power supply circuitry has been connected, so that the power supply control circuit 94 is supplying a regulated 9 volts over link 56 and DC-DC converter 92 is supplying ±5 volts over output link 55, timing circuit 89 generates a signal on links 52B and 52C to inform microprocessor 64 that the printer 24 is on-line and that power is now available, so that the microprocessor unit 34 and modem unit 33 may be powered up. This is represented in FIG. 4(f) by a power on clear signal some further time delay subsequent to clock edge 103 (e.g. 30 milliseconds).

If, rather than being connected to a printer, the test set-communications unit 23 is connected to a telephone line, the signal latched within the timing circuit 89 (as a result of the output of threshold circuit 83 on link 84) will cause timing circuit 89 to couple a signal over link 52A, so as to activate power supply control circuit 94 in an internal power supply mode. In this mode, link 42 through which a charging voltage is supplied when a battery charging source is connected to the test set-communications unit 23, is decoupled from the power supply circuit. Instead, the output of battery 54 is coupled to link 56 for supplying internal power to the microprocessor unit 34 and the modem unit 33. A power-on clear signal is supplied over link 52B to the microprocessor 64 as shown at FIG. 4(f) after connection of the 9 volt battery 54 to link 56, so that the microprocessor may be enabled. However, a (logic "0") signal is supplied over link 52C, since the charging source (e.g. printer) is not connected on line.

Figure 5:
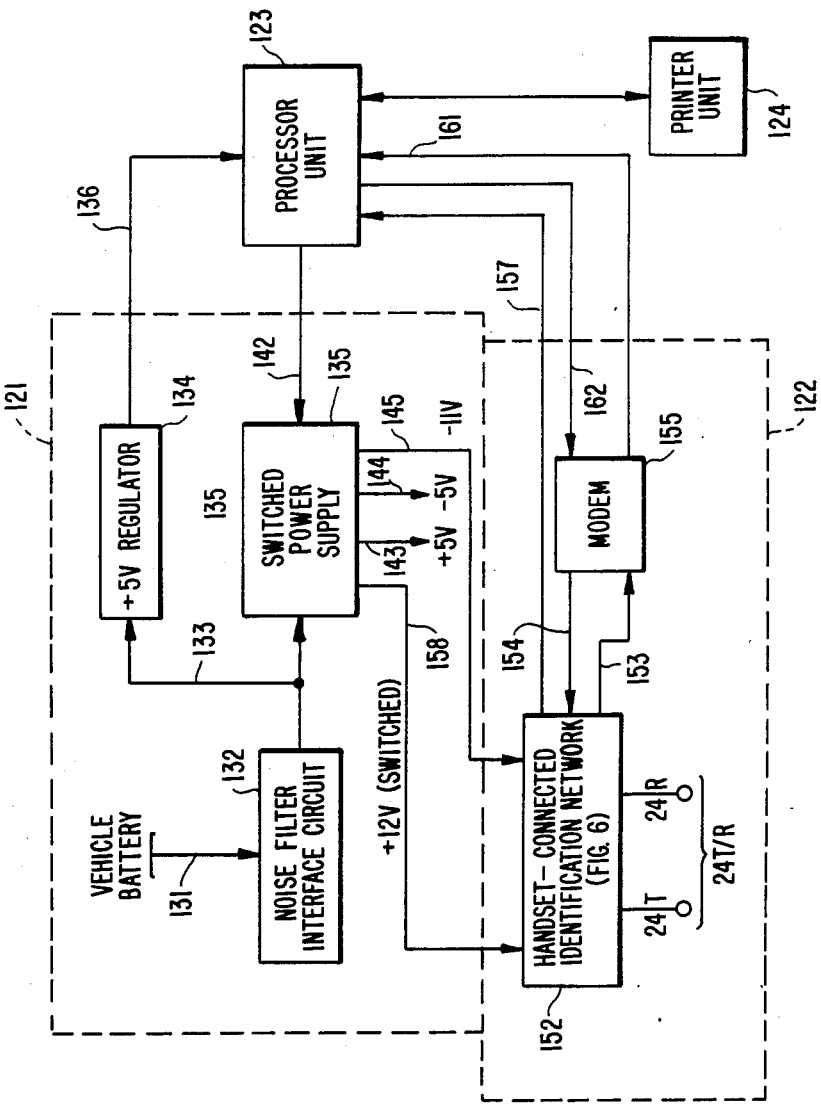
FIG. 5 is a diagrammatic illustration of a printer/battery charging unit in accordance with the present invention.

Referring now to FIG. 5, there is shown a block diagram of printer to which the field technician may connect the test set-communications unit for obtaining a printout of job assignment information that has been downloaded from the central office processor 13 and for charging the internal rechargeable battery of the test set-communications unit. The printer includes a power unit 121, a handset interface unit 122, a microprocessor unit 123 and a printer unit 124. The power unit 121 includes a conventional noise filter interface circuit 132 having an input 131 coupled to the service vehicle battery (+12 volts) and an output coupled over link 133 to a voltage regulator 134 and a switched power supply circuit 135 and one input of a connection detector 152. Voltage regulator 134 supplies a regulated +5 volts over output link 136 for operating microprocessor unit 123. Switched power supply 135 supplies regulated +5 volts, −5 volts, −11 volts and switched +12 volts over respective output links 143, 144, 145 and 158 for operating the circuitry of the printer. The operation of switched power supply circuit 135 is controlled via link 142 from microprocessor unit 123.

Printer unit 124 is coupled to and controlled by microprocessor unit 123 for providing a hard copy printout of the job assignment information that has been downloaded from the central office processor into the memory within the test set-communications unit. For this purpose, printer unit 124 may preferably comprise a commercially available dot matrix printer.

Handset interface unit 122 is comprised of a connection detector (handset-connected identification network) 152 (to be described in detail below in conjunction with the description of FIG. 6) and a modem 155 (such as a Bell 212A modem). Connection detector 152 is coupled to receive a positive 12 volt output from circuit 132 on link 133 and a negative 11 volt output on link 145 from switched power supply 135 and, via port 24T/R, supplies a charging voltage for the internal battery of the test set and interfaces data communication signals to and from modem 155.

Modem 155 is coupled to microprocessor unit 123 for coupling thereto job assignment - representative data communication signals that have been downloaded from the central office 11 into the test set-communications unit 23 and transfers those signals into memory in the processor for printout via the printer unit 124. Network 152 is also coupled via links 153 and 154 to modem 155 and provides an output on link 157 to microprocessor unit 123 indicating the connection status of terminal leads 24T and 24R of printer interface port 24 T/R. Terminal leads 24T and 24R are adapted to be coupled to the interface port 23 T/R of the test set-communications unit. When such a unit is connected to network 152, an output is provided over link 157 to the microprocessor unit 123.

As mentioned above, the printer unit is intended to reside in the service technician's vehicle, being powered by the 12 volt vehicle battery from which internal power for the printer itself is derived and from which power for the test set-communications unit, when coupled to the printer to provide a hard copy of job assignment information to the service technician, is obtained. Normally the printer is in a standby mode, with its printer, driver and battery charging portions powered down so as not to put a drain on the vehicle battery. When the test set-communications unit is connected to the printer, however, the internal circuitry of the handset connected identification network 152 detects that connection and initiates a series of operations that power-up both the printer unit and the test set-communications unit, so that the service technician may use the printer to obtain a copy of information which has been downloaded from the central office processor and, in addition, provides a charging source for the test set-communications unit's 9 volt internal rechargeable battery.

As will be described below in conjunction with the description of the operation of the home dispatch unit, the service technician may start the day by removing the test set-communications unit from the home dispatch unit and then connecting the test set-communications unit to the printer in the vehicle, so as to obtain a hard copy of that day's work schedule. As the vehicle is being driven, the 12 volt input to the power section of the printer from the vehicle battery does not create a drain on the battery, since the battery is being recharged by the vehicle's alternator. From a practical standpoint, the current drawn by the printer unit is fairly small, so that even when the vehicle engine is turned off, there is not an undue drain on the battery.

Figure 6:
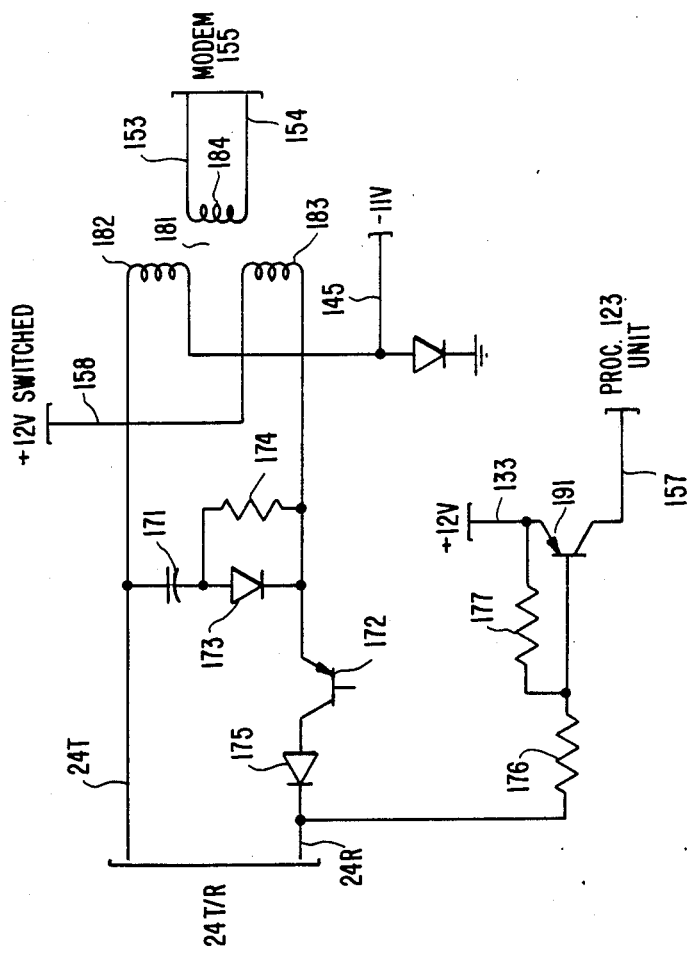
FIG. 6 is a schematic circuit diagram of the handset detector/charging coupling network of the printer/battery charging unit of FIG. 5.

FIG. 6 shows the detailed configuration of the handset-connected identification network 152, through which the test set-communications unit is connected to the printer for receiving charging voltage therefrom and for transferring job assignment instructions, previously downloaded from the central office processor 13, to the printer. The tip and ring leads 24T and 24R of the identification network are connected to respective first ends of a pair of coils 182 and 183 of a transformer 181, through decoupling transistor 172 and diode 175. An opposite second end of coil 182 is coupled to link 145 from which the −11 volt output of the switched power supply 135 is derived. Similarly, an opposite second end of coil 183 is coupled to link 133 for receiving the +12 volt output of noise filter interface circuit 132. With an approximate 1 volt drop across each of coils 182, 183 and rectifier 175, the voltage differential across leads 24T and 24R provides approximately a 20 volt power supply for charging the 9 volt battery within the power sequence unit 32, by way of power supply control circuit 94 therein. Magnetically coupled with each of coils 182 and 183 of transformer 181 is a coil 184 opposite ends of which are coupled via leads 153 and 154 to modem 155. Transformer 181 isolates the charging voltage for the power supply control circuit 94 within the test set-communications unit from the modem 155 within the printer.

As mentioned above in conjunction with the description of the operation of the power sequence unit 32 (FIG. 3), the handset-connected identification network 152 of the printer includes a capacitor connected across lines 24T and 24R, for providing a voltage that is recognized by the threshold circuit 83 within the power sequence logic circuit 51 for detecting that a printer is connected to the test set-communications unit. This capacitor is shown in FIG. 6 as capacitor 171, one terminal of which is connected to line 24T and the other terminal of which is connected through cascaded rectifiers 173 and 175 and transistor 172 to line 24R. A charging resistor 174 is connected across rectifier 173. During the time in which there is no port connection (interface port 23T/R of unit 23) across lines 24T and 24R, the 23 volt differential provided by transformer 181 provides a charging voltage through resistor 174 for charging capacitor 171. When interface port 23T/R of the test set-communications unit 23 is coupled to lines 24T and 24R and switch 85 within the power sequence unit 32 is closed, thereby placing resistor 86 between ground and link 42, capacitor 171 discharges through resistor 86. The decaying voltage on link 42 is monitored by threshold detector 83 (FIG. 3), to detect that the printer and the test set-communications unit are connected to each other through their respective ports 24T/R and 23T/R.

Line 24R is also connected to the base of a transistor 191 through resistor 176, the emitter of which is coupled to its base via resistor 177 and is connected to the 12 volt line 133 and the collector of which is connected over line 157 to microprocessor unit 123. When port 23T/R of test set-communications unit 23 is connected across lines 24R and 24T, the voltage level on line 24R drops to a voltage sufficiently less than the 12 volt supply voltage supplied to line 133, thereby turning on transistor 191 and supplying a signal over line 157 to the microprocessor unit 123, so as to indicate that a device (test set-communications unit) is connected to the printer. Microprocessor unit 123 responds by turning on the internal circuitry of the printer unit via line 142 to prepare the printer for receiving job assignment - representative data communication signals via modem 155.

OPERATION

As described above, in its standby state, the printer is situated in the service technician's vehicle and is connected to the vehicle battery via noise filter interface circuit 132. Interface port 24T/R is open. When the craftsperson's test set-communication unit is connected to the printer, (i.e. port 23T/R is connected to port 24T/R) the tip/ring leads 24T and 24R (of the handset - connected identification network 152) are connected to port 23T/R of unit 23. The power sequence unit 51 in unit 23 then examines the voltage at port 23T/R to determine whether port 23T/R is connected to a telephone line or printer (to a charging source), as described above in conjunction with the description of FIGS. 3 and 4.

With the test set-communications unit being connected to the printer, the power sequence unit 32 powers up processor unit 34 which, in turn, prepares modem unit 33 for carrying out data communications with the companion modem within the printer. At the same time, the test set - connected indication signal on line 157 causes microprocessor unit 123 to initialize the printer, turning on the switched power supply 135 and automatically conducting a data transfer communication with test set-communications unit to transfer the job assignment data resident in memory 65 of unit 23 to microprocessor unit 123.

Using keypad 63 of unit 23, the service technician enters a print command code, in response to which the data communication portions of unit 23 and printer 24 carry out a data communication sequence, so that microprocessor unit 123 is instructed as to which job assignments are to be printed. Microprocessor unit 123 then controls printer 124 to print out the job assignment information which had been automatically transferred from memory unit 65 within the test set-communications unit 23 to the memory resident in microprocessor unit 123. At the conclusion of the printout communication exchange between the test set-communication unit 23 and the printer 24, microprocessor 123 instructs printer unit 124 to print an output asking for further instructions. The service technician may key-in further instructions or he may take no action at all. The service technician may also simply decouple the test set-communications unit from the printer. If the test-communications unit remains connected with the printer, the internal 9 volt battery 54 continues to be charged. Upon the termination of communications between the respective modems in unit 23 and printer 24, the internal circuitry of each is powered down, and the charging voltage from the vehicle battery is coupled through lines 145 and 158 to provide a 20 volt input over link 42 to the power supply control circuit 94 within the power sequence unit 32 for charging the 9 volt battery.

In the event that the test set remains connected to the printer unit for a long period of time, there is the possibility of an unwanted drain on the vehicle battery as well as overcharging the 9 volt battery 54 in unit 23. Preferably therefore, microprocessor 123 contains an internal timeout clock which, after a prescribed period of time (e.g. 14 hours), turns off the switched power supply 135 via line 142 and thereby prevents a drain on the service vehicle battery and the above-mentioned overcharging of battery 54.

As described above, by providing the craftsperson with an integrated test set-communications unit which possesses data communication and information storage and retrieval capability, as well as a printer/charger unit, the present invention provides the service technician with a mechanism for expeditiously obtaining and executing job assignments, so that handling of customer service requests can be simplified and the demands on service personnel and equipment can be reduced. As a further mechanism for meeting this objective, the present invention provides a home dispatch unit through which the service technician is able to receive job assignment information when off-duty in preparation for the next day's assignments. When combined with the test set-communications unit, the home dispatch unit provides the capability for automatically receiving incoming calls addressed to it by the central office dispatch processor, downloading job assignment information from the processor and charging the test set-communication unit's internal battery. In many respects, therefore, the home dispatch unit has a functional capability corresponding to that of the printer unit. In addition, the home dispatch unit, which is intelligent-based, provides a mechanism for automatically answering incoming calls, so that data communications from the dispatch processor to the processor/storage and retrieval unit within the test set-communications unit may be effected.

Figure 7:
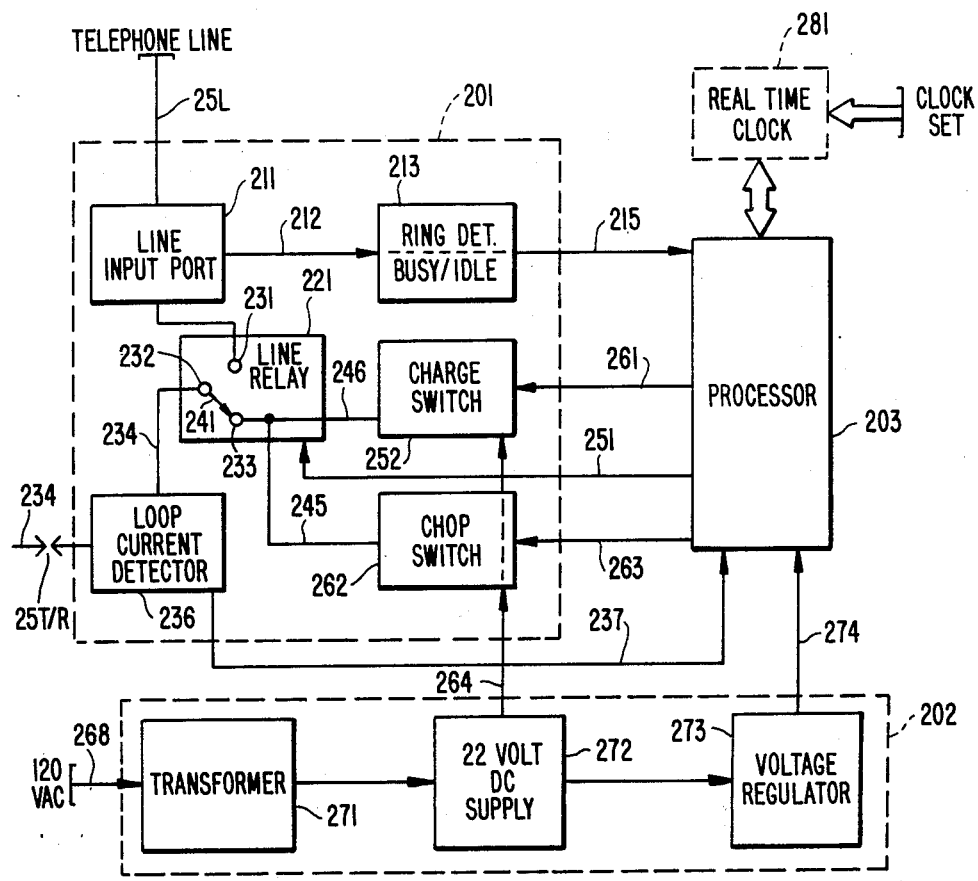
FIG. 7 is a diagrammatic illustration of a home dispatch unit in accordance with the present invention.

For this purpose, the home dispatch unit, diagrammatically shown in FIG. 7, includes a line circuit unit 201, a power supply unit 202 and a microprocessor 203. Line circuit unit 201 includes a telephone line input port 211 adapted to be coupled to a subscriber line 25L. The input port is coupled to a ring detector circuit 213 and to a first terminal 231 of a line relay 221. Ring detector circuit 213 monitors telephone line 25L for the presence of ringing (e.g. as dialed by the remote dispatch processor 13 within the central office 11) and supplies a ring detection output signal over line 215 to processor 203. A second terminal 233 of the line relay 221 is coupled to output line 245 from a chopping switch 262 and to the output 246 of a charge switch 252. Charge switch 252 is coupled to power supply unit 202 via link 264 to receive a 22 volt output voltage from a DC power supply 272 within power supply unit 202. During the idle mode, charge switch 252 is normally enabled via link 261 from processor 203 and connects link 264 to link 246 and thereby supplies a 22 volt DC supply voltage to relay contact 233. In the event of an incoming call, a signal on link 261 from processor 203 disengages charge switch 252 and thereby opens the path between the 22 volt DC power supply 272 and terminal 233 of line relay 221.

Chop switch 262 is coupled in circuit between link 264 at the output of DC power supply 272, and line 245 which is coupled to line relay contact 233. As will be explained more fully below, chop switch 262 is controlled by an output on link 263 from processor 203 in response to an incoming call, so as to repetitively supply an interrupted DC voltage to line relay 233 which is detected in the test set-communications unit 23 as an incoming call indication signal.

Terminal 232, to which movable contact 241 of the line relay 221 is connected, is coupled over link 234 through a loop current detector 236 to an interface port 25T/R to which port 23T/R of the tip/ring test set-communications unit 23 is adapted to be connected. Loop current detector 236 detects the bridging of the tip/ring leads by the internal impedance of the unit 23 in the talk mode (referenced supra) and provides an output over link 237 to processor 203 indicating that the unit is engaged and ready to receive either charging energy or data communications from the dispatch processor 13.

Power supply unit 202 provides regulated charging and supply voltage for operating the home dispatch unit and test set-communications unit 23 and for charging the 9 volt battery within unit 23. For this purpose, via a link 268, power supply unit 202 may be coupled to a standard 120 volt AC power outlet, which is coupled through a transformer 271 to a 22 volt DC supply 272. DC supply 272 supplies a 22 volt charging voltage over output link 264 for the charging of the rechargeable 9 volt battery within unit 23 and to a voltage regulator 273 for supplying a regulated 5 volt supply for operating the microprocessor 203 via link 274.

In operation, when port 23T/R of test set-communications unit 23 is connected to port 25T/R, loop current detector 236 detects loop current and supplies an output signal over link 237, informing microprocessor 203 that the home dispatch unit is connected to a test set-communications unit. In response to this connection signal on link 237, microprocessor 203 couples a signal over link 234 to the tip/ring leads of the test set-communications unit for charging its internal 9 volt battery. During this time, the processor unit 34 and modem unit 33 of the test set-communications unit 23 are powered up, having recognized the charge mode.

When the craftsperson is off duty (e.g. nighttime), test set-communications unit 23 is coupled to home dispatch unit 25 for charging the internal battery of unit 23. At some point during this off-duty period, the job assignment program within dispatch processor 13 at control office 11 will cause processor 13 to call home dispatch unit 25. In response to an incoming call on link 25L, ring detector 213 detects incoming ringing and, after detecting ringing signals for a prescribed period of time (e.g. two successive rings), supplies an output signal over line 215 to processor 203. Processor 203 responds by supplying a signal over link 261 to interrupt the charging of the internal battery of unit 23 via charge switch 252. Port 25T/R, which is coupled to port 23T/R of unit 23, is now presented with a high impedance, so that to the sequence control logic circuit 51 within the test set-communications unit 23 it appears that port 23T/R is connected to a telephone line. As was described above in connection with the description of the operation of unit 23 and the printer 24, this connection change causes the sequence control logic circuit 51 to inform processor 64 that a data communication between a remote modem (modem 16 in central office 11) and the modem 71 within the test set-communications unit 23 is to take place. Processing unit 34 and modem unit 33 are thereby turned on in preparation for a data communication between the modem 71 of unit 23 and a remote modem. During this preparation time, contact 241 of line relay 221 remains connected to charge terminal 233 and, consequently, to chop switch 262, which presents a high impedance to the tip/ring leads of the test set interface port so that power sequence unit 32 sees a line termination corresponding to a telephone line, causing unit 32 to supply a signal over line 52 to processor unit 34 to prepare for a telephone line communication.

After a prescribed timeout, processor 203 transmits the signal over link 263 to cause chop switch 262 to begin chopping (interrupting) the 22 volt output of supply 272 coupled over link 264 to link 245. The 22 volt DC output of supply 272 is chopped at a prescribed frequency (e.g. 40 Hz) and supplied as a modulation control to port 25T/R. Electro-opto isolators within audio network 44 of signalling network 31, the outputs of which are coupled to processor 64, detect the modulation of the 22 volt charging voltage and supply an output signal to the processor. This signal is read by processor 64 as indicating that a data communication from a remote information source line is about to take place. The processor unit 34 and the modem unit 33 within test set-communications unit 23 are thereby initialized in the answer mode in preparation for receipt of a data communication via incoming telephone line 25L. After completion of the present ringing cycle, processor 203 turns off the 40 Hz interruption signal on link 263 to the chop switch and, via link 251, to the line relay 221, switches the line relay contact 241 to telephone line input 231, so that the telephone line 25L is now connected to the test set-communications unit 23. Unit 23 places an answer mode modem tone on its outgoing link to the telephone line 25L and a communication sequence is established between the calling processor/modem and processor/modem within unit 23. Data communications then take place between the central office processor 13 and the test set-communications unit, with job information being downloaded into buffers in the processor unit 34 in the manner described previously.

At the end of the digital data communication sequence, processor 64 powers down the internal circuitry of unit. Upon termination of the call, the test set-communications unit opens the circuit across port 23T/R (25T/R), thereby terminating loop current. Loop current detector 236 detects the termination of loop current and supplies a signal over link 237 to processor 203 indicating that the data communication from the dispatch processor 13 and the unit 23, i.e. the incoming call, has been completed. Processor 203 then switches the line relay contact 241 from contact 231 to contact 233 via a signal on link 251 and, transmits a signal over line 261 to cause charge switch 252, so as to reengage the connection between the power supply 272 and the outgoing link 234 to unit 23 for charging its internal battery.

In the foregoing embodiment of the home dispatch unit 25, telephone line 25L to which the unit is connected is preferably a dedicated line for the exclusive use of the dispatch unit to which the dispatch processor calls and downloads information into the test set-communications unit during the off duty hours of the service technician. It is, of course, possible to connect the home dispatch unit to any telephone line; the result, however, would be that the home dispatch unit would answer all incoming calls (not only calls from dispatch processor 13 in central office 11). For this reason, a separate dedicated line should be used for the embodiment illustrated in FIG. 7.

In lieu of providing a separate dedicated telephone line in the home of the service technician for use with the home dispatch unit, a modified configuration of the home dispatch unit, shown in broken line form in FIG. 7, may be employed. Pursuant to this modification, the ring detector circuit 213 is provided with a busy/idle detection circuit, as conventionally employed in telephone dialing equipment. In addition, microprocessor 203 is coupled to a real time clock 281 which, through external key switches, is employed to set the time at which the microprocessor will dial up the dispatch processor from the service technicians home. In this embodiment, the software within the microprocessor 203 is sequenced in a manner similar to receiving incoming calls, but with a slight modification for initiating outgoing calls. The other portions of the line circuit 201 and power supply unit 202 are unchanged.

In operation, as in the previous embodiment, with the tip/ring terminals of the test set communications unit connected to the loop current detector 236, processor 203 couples the output of the power supply 272 through the charge switch 252 and line relay 221 for supplying charging current to the internal battery of the test set-communications unit. At the dial-up time that has been loaded into the real time clock via external key switches, time clock 281 enables microprocessor 203, so that microprocessor 203 will initiate a call to the dispatch processor 13 within the central office 11. In response to the output of the real time clock, processor 203 couples a signal over link 261 opening charge switch 252 in the same manner that it was switched from the charge mode to the call receipt mode in the previously described embodiment. Power sequence logic circuit 51 detects that unit 23 is connected to a phone line, so that the unit 34 within unit 23 is powered up and, via a prescribed chopping frequency signal on line 263, chopping current is supplied through chop switch 262, which is detected in the electro-opto isolators of audio network of unit 23, to inform processor 64 to prepare for dialing. Processor 64 then engages the modem unit 33 in preparation for calling up the dispatch processor 11 within the central office 10. Processor 203 within the home dispatch unit then transmits a signal over line 251 to the line relay 221 to switch contact 241 and thereby connect the link 234 to the telephone line 25L. Processor unit 34 and modem unit 33 within unit 23 carry out a data communication with the central office processor, just as in the case of the service technician using the keypad described above. In this circumstance, however, a previously stored instruction sequence in memory within the processor unit 34 controls all communications. No voice menu is provided to unit 23. At the conclusion of the data transmission, with the downloading of instruction information from the dispatch processor 13, processor unit 34 and modem unit 33 within the test set-communications unit 23 are powered down and the home dispatch unit 25 reverts to its charge mode. In the event that the telephone line 25L is busy, an internal timing program stored within processor 203 waits a prescribed redial time and then again inquires of the state of line 215. Once the output of the circuit 213 indicates that the line is free, the above-described communication sequence takes place.

As will be appreciated from the foregoing description, the present invention provides the local telephone company with a test set-communications device that facilitates communications between field service personnel and automated control equipment at the central office. Not only are the delays commonly encountered by service technicians circumvented, but there is afforded a substantial increase in productivity, as task assignment pick-up travel time is avoided. Moreover, because the test set-communication unit is readily interfaced with each of a battery charger-containing printer unit and home dispatch unit, it is unnecessary to remove the battery for charging by a separate device. This enables the test set-communication unit circuitry to be effectively ruggedized to withstand severe environmental abuse.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone technician's service device which is adapted to be interfaced with a telephone line for servicing a telephone network, an arrangement for effecting data communications with an information source coupled to said telephone network comprising:
   first means, adapted to be coupled to said telephone line, for accessing said information source and causing data communication signals representative of prescribed information to be transmitted from said information source via said telephone network to said service device; and
   second means, coupled to said first means, for storing information represented by said data communication signals for selective retrieval by said technician.

2. An arrangement according to claim 1, further including third means, adapted to be coupled to said second means, for retrieving information stored thereby and providing a perceptible representation of said information to said technician.

3. An arrangement according to claim 2, wherein said third means comprises means for providing said information to said technician in visually perceptible form.

4. An arrangement according to claim 1, further including third means, adapted to be coupled to said second means, for retrieving information stored thereby and providing a printed copy of the retrieved information.

5. An arrangement according to claim 2, wherein said service device includes an internal battery for supplying electrical power thereto and wherein said third means includes means for supplying charging energy to said internal battery.

6. An arrangement according to claim 5, wherein said arrangement comprises a prescribed interface port through which said arrangement is coupled to said telephone line and wherein said third means is adapted to supply said charging energy to said internal battery through said prescribed interface port.

7. An arrangement according to claim 5, wherein said third means is adapted to be coupled to an external power supply providing a voltage in excess of that required for operation of said service device and includes means for converting said voltage to one or more voltage outputs for operating said arrangement.

8. An arrangement according to claim 5, wherein said third means includes means, adapted to be selectively coupled to said second means, for enabling the retrieval of information stored thereby and the generation of a visually perceptible copy of said retrieved information during a first mode of operation thereof and for supplying said charging energy to said internal battery during a second mode of operation thereof.

9. An arrangement according to claim 6, wherein said arrangement further includes fourth means, coupled to said prescribed interface port, for detecting whether said arrangement is coupled thereby to a telephone line or to said third means.

10. An arrangement according to claim 9, wherein said detecting means includes means for causing said service device to be powered by said internal battery in response to detecting that said prescribed interface port is effectively coupled to a telephone line and for causing said battery to receive charging energy from said third means in response to detecting that said prescribed interface port is effectively coupled to said third means.

11. An arrangement according to claim 9, wherein said fourth means includes means for enabling said first means to access said information source, so that information is transmitted therefrom and stored by said second means, in response to detecting that said prescribed interface port is effectively coupled to a telephone line, and for enabling a communication between said second and third means so that information stored by said second means may be retrieved by said third means and a perceptual representation thereof provided to said technician, in response to detecting that said prescribed interface port is effectively coupled to said third means.

12. An arrangement according to claim 1, wherein said first means includes means for receiving, via said telephone line, audio information signals from said information source and controllably amplifying said audio information signals for presentation to said technician, in response to which said technician may controllably cause said first means to access said information source and cause said data communication signals to be transmitted from said information source via said telephone line to said service device.

13. An arrangement according to claim 12, wherein said first means includes means for coupling said data communication signals to said controllably amplifying means and thereby providing to said service technician an audio indication of the transmission of said data communication signals from said information source to said service device.

14. An arrangement according to claim 12, further including third means, adapted to be coupled to said second means, for retrieving information stored thereby and providing a perceptible representation of said information to said technician.

15. An arrangement according to claim 14, wherein said service device includes an internal battery for supplying electrical power thereto and wherein said third means includes means for supplying charging energy to said internal battery.

16. An arrangement according to claim 15, wherein said arrangement comprises a prescribed interface port through which said arrangement is coupled to said telephone line and wherein said third means is adapted to supply said charging energy to said internal battery through said prescribed interface port.

17. An arrangement according to claim 15, wherein said third means is adapted to be coupled to an external power supply providing a prescribed voltage and includes means for converting said voltage into one or more voltage outputs for operating said arrangement.

18. An arrangement according to claim 17, wherein said arrangement further includes fourth means, coupled to said prescribed interface port, for detecting whether said arrangement is coupled thereby to a telephone line or to said third means.

19. An arrangement according to claim 18, wherein said detecting means includes means for causing said service device to be powered by said internal battery in response to detecting that said prescribed interface port is effectively coupled to a telephone line and for causing said battery to receive charging energy from said third means in response to detecting that said prescribed interface port is effectively coupled to said third means.

20. An arrangement according to claim 18, wherein said fourth means includes means for enabling said first means to access said information source, so that information is transmitted therefrom and stored by said second means, in response to detecting that said prescribed interface port is effectively coupled to a telephone line, and for enabling a communication between said second and third means so that information stored by said second means may be retrieved by said third means and a perceptible representation thereof provided to said technician, in response to detecting that said prescribed interface port is effectively coupled to said third means.

21. For use with a telephone technician's service device which is adapted to be interfaced with a telephone line for servicing a telephone network, an arrangement for effecting data communications with an information source coupled to said telephone network comprising:

a communications unit contained within said service device and having a telephone line interface port and including first means, coupled to said telephone line interface port, for accessing said information source via a telephone line coupled thereto and causing data communication signals representative of prescribed information to be transmitted from said information source via said telephone network to said service device; and second means, coupled to said first means, for storing information represented by said data communication signals for selective retrieval by said technician; and an information retrieval unit having a signalling interface port and comprising third means, coupled to said signalling interface port and adapted to be coupled to said telephone line interface port thereby, for retrieving information stored by said second means and providing a perceptible representation of said information to said technician.

22. An arrangement according to claim 21, wherein said third means comprises means for providing a printed recording of the retrieved information.

23. An arrangement according to claim 21, wherein said service device includes an internal battery for supplying electrical power thereto and wherein said information retrieval unit further includes fourth means, coupled to said signalling interface port, for controllably supplying charging energy to said internal battery when the telephone line interface port of said communications unit is coupled to the signalling interface port of said information retrieval unit.

24. An arrangement according to claim 23, wherein said communications unit further includes fifth means, coupled to said telephone line interface port, for detecting whether said communications unit is coupled thereby to a telephone line or to said signalling interface port of said information retrieval unit.

25. An arrangement according to claim 21, wherein said service device includes an internal battery for supplying electrical power thereto and wherein said communications unit further includes fourth means, coupled to said telephone line interface port, for detecting whether said communications unit is coupled thereby to a telephone line or to a device for supplying charging energy to said internal battery.

26. An arrangement according to claim 25, wherein said detecting means includes means for causing said communications unit to be powered by said battery in response to detecting that said telephone line interface port is coupled to a port termination effectively representative of a telephone line, and for causing said battery to receive charging energy from said device for supplying charging energy thereto in response to detecting that said telephone line interface port is coupled to a port termination effectively representative of a connection to a device for supplying charging energy.

27. An arrangement according to claim 24, wherein said fifth means includes means for causing said communications unit to be powered by said battery in response to detecting that said telephone line interface is coupled to a port termination effectively representative of a telephone line, and for causing said battery to receive charging energy from said fourth means in response to detecting that telephone line interface port is coupled to said signalling interface port of said information retrieval unit.

28. An arrangement according to claim 21, wherein said communications unit further includes fourth means, coupled to said telephone line interface port, for detecting whether said communications unit is coupled thereby to a telephone line or to said signalling interface port of said information retrieval unit.

29. An arrangement according to claim 28, wherein said fourth means includes means for enabling said first means to access said information source, so that information is transmitted therefrom and stored by said second means, in response to detecting that said telephone line interface port is effectively coupled to a telephone line, and for enabling a communication between said second and third means so that information stored by said second means may be retrieved by said third means and a perceptible representation thereof provided to said technician, in response to detecting that said telephone line interface port is effectively coupled to said signalling interface port of said information retrieval unit.

30. An arrangement according to claim 29, wherein said service device includes an internal battery for supplying electrical power thereto and wherein said information retrieval unit further includes fifth means, coupled to said signalling interface port, for controllably supplying charging energy to said internal battery when the telephone line interface port of said communications unit is coupled to the signalling interface port of said information retrieval unit.

31. An arrangement according to claim 30, wherein said third means comprises means for providing a printed recording of the retrieved information.

32. For use with a telephone technician's service device which is adapted to be interfaced with a telephone line for servicing a telephone network, an arrangement for enabling said technician to effect data communications with an information source coupled to said telephone network comprising:

a communications unit contained within said service device and having a telephone line interface port for coupling said device to a telephone line, and including first means, coupled to said telephone line interface port, for accessing said information source via a telephone line coupled thereto and causing data communication signals representative of prescribed information to be transmitted from said information source via said telephone network to said service device; and second means, coupled to said first means, for storing information represented by said data communication signals for subsequent selective retrieval to provide a perceptible representation of said information to said technician.

33. An arrangement according to claim 32, wherein said service device includes an internal battery for supplying electrical power thereto and wherein said communications unit includes means, coupled between said telephone line interface port and said battery, for controllably supplying charging energy to said battery when a source of battery charging energy is coupled to said telephone line interface port.

34. An arrangement according to claim 33, wherein said communications unit further includes third means, coupled to said telephone line interface port, for detecting whether said communications unit is coupled thereby to a telephone line or to a source of battery charging energy.

35. An arrangement according to claim 34, wherein said third means includes means for enabling said first means to access said information source, so that information is transmitted therefrom and stored by said second means, in response to detecting that said telephone line interface port is effectively coupled to a telephone line, and for controllably causing said battery to receive charging energy from said source of battery charging energy in response to detecting that said telephone line interface port is effectively coupled to said source of battery charging energy.

36. An arrangement according to claim 32, wherein said first means includes means for receiving, via said telephone link, audio information signals from said information source and controllably amplifying said audio information signals for presentation to said technician, in response to which said technician may controllably cause said first means to access said information source and cause said data communication signals to be transmitted from said information source via said telephone line to said service device.

37. An arrangement according to claim 36, wherein said first means includes means for coupling said data communication signals to said controllably amplifying means and thereby providing to said service technician an audio indication of the transmission of said data communication signals from said information source to said service device.

38. An arrangement according to claim 32, wherein said service device comprise a hand-held telephone test set.

39. An arrangement according to claim 32, wherein said arrangement further includes an information retrieval unit having a signalling interface port and comprising third means, coupled to said signalling interface port, for controllably retrieving information stored by said second means and providing a perceptible representation of said information to said technician when said telephone interface port of said communications unit is coupled to the signalling interface port of said information retrieval unit.

40. An arrangement according to claim 39, wherein said third means comprises means for providing a printed recording of retrieved information.

41. An arrangement according to claim 32, wherein said arrangement further includes an information retrieval unit having a signalling interface port and comprising third means, coupled to said signalling interface port, for controllably retrieving information stored by said second means and providing a perceptible representation of said information to said technician when said telephone interface port of said communications unit is coupled to the signalling interface port of said information retrieval unit.

42. An arrangement according to claim 41, wherein said information retrieval unit contains said source of battery charging energy.

43. An arrangement according to claim 32, wherein said first means includes means for receiving, via said telephone link, audio information signals from said information source and controllably amplifying said audio information signals for presentation to said technician, in response to which said technician may controllably cause said first means to access said information source and cause said data communication signals to be transmitted from said information source via said telephone line to said service device.

44. An arrangement according to claim 43, wherein said first means includes means for coupling said data communication signals to said controllably amplifying means and thereby providing to said service technician an audio indication of the transmission of said data communication signals from said information source to said service device.

45. An arrangement according to claim 32, further including a telephone line interface unit having a first port adapted to be coupled to a telephone line and a second port adapted to be coupled to said telephone line interface port of said communications unit for controlling the establishment of a telephone line connection between said telephone line and said communications unit by way of said first and second ports, so that a data communications transmission between said information source and said communications unit may take place.

46. An arrangement according to claim 45, wherein said service device includes an internal battery for supplying electrical power thereto and wherein said communications unit includes means, coupled between said telephone line interface port and said battery, for controllably supplying charging energy to said battery when a source of battery charging energy is coupled to said telephone line interface port.

47. An arrangement according to claim 46, wherein said telephone line interface unit includes third means, coupled to said second port thereof, for controllably coupling a source of battery charging energy to said second port when said telephone line interface port of said communications unit is coupled to said second port.

48. An arrangement according to claim 47, wherein said telephone line interface unit further comprises fourth means, coupled to said third means and said first and second ports, for detecting an incoming call at said first port and, in response thereto, controllably interrupting the coupling of said source of battery charging energy to said second port and providing a signal flow path between said first and second ports.

49. An arrangement according to claim 48, wherein said fourth means includes means for enabling said communications unit to receive and store data communications signals transmitted from said source of information signals.

50. An arrangement according to claim 47, wherein said telephone line interface unit further comprises fourth means, coupled to said third means and said first and second ports, for controllably interrupting the coupling of said source of battery charging energy to said second port and establishing a signal flow path between said first and second ports and thereby between said telephone line interface port of said communications unit and a telephone line.

51. An arrangement according to claim 50, wherein said fourth means includes means for controllably causing said first means to access said information source via said signal flow path that has been established between said telephone line interface port of said communications unit and said telephone line, whereby said data communication signals are transmitted from said information source via said telephone line and said signal flow path and stored by said second means.

52. For use with a telephone technician's service device which is adapted to be interfaced with a telephone line for servicing a telephone network, said service device containing a communications unit for accessing a source of information signals via a telephone line coupled to a telephone line interface port of said communications unit and storing data communications signals representative of prescribed information that have been transmitted from said information source via said telephone network to said service device, an arrangement for providing a recording of said prescribed information for use by said service technician comprising:

recording means; and control means, coupled to said recording means and having a first port adapted to be coupled to said telephone line interface port, for controllably retrieving information stored in said communications unit and causing said retrieved information to be recorded by said recording means.

53. An arrangement according to claim 52, wherein said recording means includes a printer unit for providing a hard copy of said retrieved information to said service technician.

54. An arrangement according to claim 52, wherein said service device includes an internal battery for supplying electrical power thereto and wherein said arrangement further includes charging means, coupled to said control means, for controllably supplying charging energy to said internal battery when said telephone line interface port is coupled to said first port.

55. An arrangement according to claim 54, wherein said charging means is adapted to be coupled to an external power source and includes means for controllably deriving said charging energy for said internal battery from said external power source.

56. An arrangement according to claim 52, wherein said control means includes means for detecting the coupling of said telephone line interface port of said communications unit to said first port and, in response thereto, enabling the establishment of a data communication transmission between said communication unit and said arrangement whereby said stored information may be retrieved from said communications unit by way of said data communication transmission and recorded by said recording means.

57. For use with a telephone technician's service device which is adapted to be interfaced with a telephone line for servicing a telephone network, said service device containing a communications unit for communicating with a source of information signals via a telephone line interface port of said communications unit and storing data communication signals representative of prescribed information that have been transmitted from said information source via said telephone network to said service device, an arrangement for controlling the operation of said communications unit comprising:

a first port adapted to be coupled to a telephone line;

a second port adapted to be coupled to the telephone line interface port of said communications unit; and means, coupled to said first and second ports, for controllably establishing a signal flow path between said first and second ports and thereby between said telephone line interface port of said communications unit and a telephone line, whereby the transmission of data communications signals from said source of information signals to said communications unit for storage thereby may take place.

58. An arrangement according to claim 57, wherein said service device includes an internal battery for supplying electrical power thereto and wherein said communications unit includes means, coupled between said telephone line interface port and said battery, for controllably supplying charging energy to said battery when a source of battery charging energy is coupled to said telephone line interface port.

59. An arrangement according to claim 58, further including second means, coupled to said second port for controllably coupling a source of battery charging energy to said second port when said telephone line interface port of said communications unit is coupled to said second port.

60. An arrangement according to claim 59, further including third means, coupled to said second means and said first and second ports, for detecting an incoming call at said first port and, in response thereto, controllably interrupting the coupling of said source of battery charging energy to said second port and providing a signal flow path between said first and second ports.

61. An arrangement according to claim 60, wherein said third means includes means for enabling said communications unit to receive and store data communications signals transmitted from said source of information signals.

62. An arrangement according to claim 59, further including third means, coupled to said second means and to said first and second ports, for controllably interrupting the coupling of said source of battery charging energy to said second port and establishing a signal flow path between said first and second ports and thereby between said telephone line interface port of said communications unit and a telephone line.

63. An arrangement according to claim 62, wherein said third means includes means for controllably causing said first means to access said information source via said signal flow path that has been established between said telephone line interface port of said communications unit and said telephone line, whereby said data communication signals are transmitted from said information source via said telephone line and said signal flow path and stored by said communications unit.

64. For use with a telephone craftsperson's test set which is adapted to be coupled to a telephone line via a telephone line interface port for testing prescribed characteristics of said telephone line, an arrangement for enabling said craftsperson to receive task assignment information from a task assignment center comprising a communications unit, contained within said test set and coupled to said telephone line interface port, for establishing a communication link with said task assignment center over said telephone line and storing therein task assignment information that is transmitted thereto from said task assignment center.

65. An arrangement according to claim 64, further comprising a printer unit having a printer interface port adapted to be coupled to the telephone line interface port of said communications unit for accessing said stored task assignment information and providing a print out thereof for use by said craftsperson.

66. An arrangement according to claim 65, wherein said test set includes an internal rechargeable battery for supplying electrical power to said test set and said communications unit therein and wherein said printer unit includes a battery charging unit which controllably couples charging energy to the battery contained within said test set when the telephone line interface port thereof is coupled to the printer interface port of said printer.

67. An arrangement according to claim 64, further comprising a telephone line interface unit having a first port adapted to be coupled to a telephone line and a second port adapted to be coupled to the telephone line interface port, said telephone line interface unit establishing a telephone call connection between said test set and said task assignment center so that task assignment information may be downloaded from said task assignment center and stored in said test set.

68. An arrangement according to claim 67, further comprising a printer unit having a printer interface port adapted to be coupled to the telephone line interface port of said communications unit for accessing said stored task assignment information and providing a print out thereof for use by said craftsperson.

69. An arrangement according to claim 67, wherein said test set includes an internal rechargeable battery for supplying electrical power to said test set and said communications unit therein and wherein said telephone line interface unit includes a battery charging unit which controllably couples charging energy to the battery contained within said test set when the telephone line interface port thereof is coupled to the printer interface port of said telephone line interface unit.

70. An arrangement according to claim 67, wherein said telephone line interface unit is capable of either causing a call to be placed to said task assignment center or receiving a call from said task assignment center for downloading task assignment information therefrom for storage in said communications unit, without requiring on-line participation by said craftsperson.

* * * * *